United States Patent
Sharmak et al.

(10) Patent No.: US 11,267,765 B2
(45) Date of Patent: *Mar. 8, 2022

(54) USE OF AMORPHOUS CALCIUM CARBONATE IN A FIRE-RESISTANT INORGANIC MORTAR SYSTEM BASED ON ALUMINOUS CEMENT TO INCREASE LOAD VALUES AT ELEVATED TEMPERATURES

(71) Applicant: Hilti Aktiengesellschaft, Schaan (LI)

(72) Inventors: Anna Sharmak, Augsburg (DE);
Armin Pfeil, Kaufering (DE);
Friedlinde Götz-Neunhöffer, Erlangen (DE); Daniel Jansen, Fuerth (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 16/498,231

(22) PCT Filed: Mar. 29, 2018

(86) PCT No.: PCT/EP2018/058065
§ 371 (c)(1),
(2) Date: Sep. 26, 2019

(87) PCT Pub. No.: WO2018/184973
PCT Pub. Date: Oct. 11, 2018

(65) Prior Publication Data
US 2020/0377424 A1 Dec. 3, 2020

(30) Foreign Application Priority Data
Apr. 7, 2017 (EP) .................................... 17165410

(51) Int. Cl.
*C04B 22/10* (2006.01)
*E21D 20/02* (2006.01)
*C04B 40/06* (2006.01)
*C04B 28/06* (2006.01)
*E21D 21/00* (2006.01)
*C04B 111/00* (2006.01)

(52) U.S. Cl.
CPC ............ *C04B 40/065* (2013.01); *C04B 22/10* (2013.01); *C04B 28/065* (2013.01); *E21D 20/021* (2013.01); *E21D 21/008* (2013.01); *C04B 2111/00715* (2013.01)

(58) Field of Classification Search
CPC ....... C04B 14/06; C04B 14/28; C04B 20/008; C04B 20/0088; C04B 2103/67; C04B 2103/32; C04B 22/143; C04B 28/06; C04B 22/147; C04B 22/165; C04B 28/065; C04B 40/065; C04B 22/062; C04B 24/06; C04B 24/38; C04B 24/383; C04B 40/0625; C04B 14/104; C04B 18/146; C04B 2103/0094; C04B 2103/12; C04B 2103/22; C04B 2103/30; C04B 2103/44; C04B 22/142; C04B 24/003; C04B 24/386; C04B 2103/0008; C04B 2111/00715; C04B 2111/00724; C04B 2111/28; C04B 40/0658; C04B 40/0666; C04B 22/10; C04B 22/002; C04B 2103/20; C04B 2103/445; C04B 24/04; C04B 40/0039; C04B 2103/10; E21D 20/021; E21D 21/008; Y02W 30/94; F16B 13/02; F16B 13/141

See application file for complete search history.

(56) References Cited

U.S. PATENT DOCUMENTS

| | | | |
|---|---|---|---|
| 3,826,665 A | 7/1974 | Hovasse et al. | |
| 4,126,009 A | 11/1978 | Tomic | |
| 4,190,454 A * | 2/1980 | Yamagisi | C04B 28/02 106/695 |

(Continued)

FOREIGN PATENT DOCUMENTS

| | | |
|---|---|---|
| CN | 1213046 | 4/1999 |
| CN | 101283018 | 10/2008 |

(Continued)

OTHER PUBLICATIONS

International Search Report dated Apr. 24, 2018 in PCT/EP2018/058065.
Written Opinion dated Apr. 24, 2018 in PCT/EP2018/058065.
International Search Report dated Jan. 19, 2017 in PCT/EP2016/075024.
Written Opinion of the International Searching Authority dated Jan. 19, 2017 in PCT/EP2016/075024.
International Search Report dated Feb. 28, 2017 in PCT/EP2016/075027.

(Continued)

*Primary Examiner* — Shuangyi Abu Ali
(74) *Attorney, Agent, or Firm* — Grüneberg and Myers PLLC

(57) ABSTRACT

Amorphous calcium carbonate is included in a fire-resistant inorganic mortar system for a fire-resistant chemical fastening of anchors and post-installed reinforcing bars in mineral substrates. The system includes a curable aluminous cement component A and an initiator component B for initiating the curing process. The component A includes at least one blocking agent selected from the group of phosphoric acid, metaphosphoric acid, phosphorous acid and phosphoric acids, at least one plasticizer and water. The component B includes an initiator, at least one retarder, at least one mineral filler and water. Moreover, amorphous calcium carbonate in a fire-resistant inorganic mortar increases load values. Also, a method is used for a fire-resistant chemical fastening of anchors and post-installed reinforcing bars in mineral substrates, such as structures made of brickwork, concrete, pervious concrete or natural stone.

12 Claims, No Drawings

(56) References Cited

U.S. PATENT DOCUMENTS

| | | | |
|---|---|---|---|
| 4,305,687 A | 12/1981 | Parker | |
| 4,455,171 A | 6/1984 | Spensley et al. | |
| 4,802,992 A | 2/1989 | Fong et al. | |
| 5,565,026 A | 10/1996 | Hense et al. | |
| 6,029,417 A | 2/2000 | Leibhard et al. | |
| 6,240,696 B1 | 6/2001 | Ludwig et al. | |
| 7,922,809 B1 | 4/2011 | Oonstantz et al. | |
| 8,017,058 B2 | 9/2011 | Oba et al. | |
| 8,062,418 B2 | 11/2011 | Constantz et al. | |
| 8,114,214 B2 | 2/2012 | Constantz et al. | |
| 8,133,317 B2 | 3/2012 | Hirao et al. | |
| 8,137,455 B1 | 3/2012 | Constantz et al. | |
| 8,177,909 B2 | 5/2012 | Constantz et al. | |
| 8,268,932 B2 | 9/2012 | Jansen et al. | |
| 8,304,474 B2 | 11/2012 | Wieland | |
| 8,801,851 B2 | 8/2014 | Jezequel et al. | |
| 8,808,449 B2 | 8/2014 | Jezequel et al. | |
| 8,906,156 B2 | 12/2014 | Constantz et al. | |
| 8,932,400 B2 | 1/2015 | Chen et al. | |
| 9,056,790 B2 | 6/2015 | Chen et al. | |
| 9,216,927 B2 | 12/2015 | Hagen et al. | |
| 9,434,647 B2 | 9/2016 | Taquet et al. | |
| 9,464,524 B2 | 10/2016 | Glogger et al. | |
| 9,950,954 B2 | 4/2018 | Mikaelsson | |
| 10,822,284 B2 | 11/2020 | Pfeil et al. | |
| 2005/0239630 A1 | 10/2005 | Oba et al. | |
| 2007/0266906 A1 | 11/2007 | Garcia | |
| 2008/0300361 A1 | 12/2008 | Jansen et al. | |
| 2009/0032999 A1 | 2/2009 | Oba et al. | |
| 2009/0151604 A1* | 6/2009 | Hirao | C04B 28/02 106/705 |
| 2010/0175589 A1* | 7/2010 | Charpentier | C04B 40/065 106/696 |
| 2011/0057603 A1 | 3/2011 | Constantz et al. | |
| 2011/0067600 A1* | 3/2011 | Constantz | B01D 53/62 106/640 |
| 2011/0067605 A1 | 3/2011 | Constantz et al. | |
| 2011/0203489 A1 | 8/2011 | Constantz et al. | |
| 2011/0259228 A1 | 10/2011 | Mills et al. | |
| 2011/0313083 A1 | 12/2011 | Wieland | |
| 2012/0073474 A1 | 3/2012 | Constantz et al. | |
| 2012/0145044 A1 | 6/2012 | Mills et al. | |
| 2012/0145047 A1 | 6/2012 | Constantz et al. | |
| 2012/0312193 A1 | 12/2012 | Jezequel et al. | |
| 2012/0315464 A1 | 12/2012 | Refouvelet et al. | |
| 2012/0318171 A1 | 12/2012 | Jezequel et al. | |
| 2013/0112432 A1 | 5/2013 | Buergel | |
| 2013/0139727 A1 | 6/2013 | Constantz et al. | |
| 2013/0295378 A1 | 11/2013 | Bonin et al. | |
| 2014/0121303 A1 | 5/2014 | Hagen et al. | |
| 2014/0130708 A1 | 5/2014 | Chen et al. | |
| 2014/0216653 A1 | 8/2014 | Wu et al. | |
| 2014/0235760 A1 | 8/2014 | Bichler et al. | |
| 2014/0343194 A1* | 11/2014 | Taquet | C04B 22/165 524/5 |
| 2014/0363239 A1 | 12/2014 | Glogger et al. | |
| 2015/0031799 A1 | 1/2015 | Constantz et al. | |
| 2015/0096464 A1 | 4/2015 | Chen et al. | |
| 2015/0141554 A1 | 5/2015 | Mikaelsson | |
| 2015/0203407 A1 | 7/2015 | Girot et al. | |
| 2015/0307401 A1 | 10/2015 | Chen et al. | |
| 2017/0349498 A1 | 12/2017 | Bernard et al. | |
| 2018/0251404 A1 | 9/2018 | Pfeil et al. | |
| 2018/0282217 A1 | 10/2018 | Falger et al. | |
| 2018/0290935 A1 | 10/2018 | Pfeil et al. | |
| 2018/0305265 A1 | 10/2018 | Pfeil et al. | |
| 2018/0319712 A1 | 11/2018 | Seip | |
| 2019/0071353 A1 | 3/2019 | Pfeil et al. | |

FOREIGN PATENT DOCUMENTS

| | | | |
|---|---|---|---|
| CN | 101291888 | | 10/2008 |
| CN | 102190453 | | 9/2011 |
| CN | 102712548 | | 10/2012 |
| CN | 103827515 | | 5/2014 |
| CN | 104125936 | | 10/2014 |
| DE | 2 311 239 | | 10/1973 |
| DE | 10 2010 062 061 | | 5/2012 |
| DE | 10 2011 083 153 | | 3/2013 |
| EP | 0 005 987 | | 12/1979 |
| EP | 0 081 385 | | 6/1983 |
| EP | 0 113 593 | | 7/1984 |
| EP | 0 241 230 | | 10/1987 |
| EP | 0 353 062 | | 1/1990 |
| EP | 0 495 336 | | 7/1992 |
| EP | 0 650 942 | | 5/1995 |
| EP | 0 856 669 | | 8/1998 |
| EP | 0 867 624 | | 9/1998 |
| EP | 1 213 492 | | 6/2002 |
| EP | 1 535 887 | | 6/2005 |
| EP | 2 162 410 | | 5/2011 |
| EP | 2 607 330 | | 6/2013 |
| EP | 2 679 560 | | 1/2014 |
| EP | 3 078 646 | | 10/2016 |
| FR | 2 918 055 | | 1/2009 |
| FR | 2 956 397 | | 8/2011 |
| FR | 3 030 504 | | 6/2016 |
| GB | 2 166 430 | | 5/1986 |
| GB | 2 188 922 | | 10/1987 |
| JP | 58-115052 | | 7/1983 |
| JP | 63-89440 | | 4/1988 |
| JP | 2000-46029 | | 2/2000 |
| JP | 6122566 | | 4/2017 |
| RU | 2 341 624 | | 12/2008 |
| WO | 01/28955 | | 4/2001 |
| WO | 2013/004621 | | 1/2013 |
| WO | 2013/041259 | | 3/2013 |
| WO | 2013/093344 | | 6/2013 |
| WO | WO-2013093344 A1 * | 6/2013 | C04B 22/165 |
| WO | 2014/009298 | | 1/2014 |
| WO | 2017/067951 | | 4/2017 |
| WO | 2017/067952 | | 4/2017 |
| WO | 2017/067953 | | 4/2017 |
| WO | 2017/067954 | | 4/2017 |
| WO | 2017/076807 | | 5/2017 |

OTHER PUBLICATIONS

Written Opinion of the International Searching Authority dated Feb. 28, 2017 in PCT/EP2016/075027.

International Search Report dated Jan. 20, 2017 in PCT/EP2016/075031.

Written Opinion of the International Searching Authority dated Jan. 20, 2017 in PCT/EP2016/075031.

Inland River Surveying, Canalization Project; 1980, p. 380 with English translation, 4 pages.

Japanese Office Action dated Jan. 21, 2020 in Japanese Application 2018-519942, with English translation (5 pages).

Xianjiang et al, The Latest Major Points of Highway Engineering Construction and Prevention of Common Problems; 2001, vol. I, p. 567 with English translation, 5 pages.

Ying et al., User Manual of Huibao Curtain Wall Calculation Software; 2015, p. 268, with English translation, 4 pages.

Wikipedia: Amorphous calcium carbonate, https://en.wikipedia.org/wiki/Amorphous_calcium_carbonate, obtained from from the internet Dec. 9, 2020, 6 pages.

U.S. Appl. No. 15/764,897, filed Mar. 30, 2018, 2018/0282217, Falger et al.

U.S. Appl. No. 15/765,504, filed Apr. 3, 2018, 2019/0071353, Pfeil et al.

U.S. Appl. No. 15/765,509, filed Apr. 3, 2018, 2018/0251404, Pfeil et al.

U.S. Appl. No. 15/769,444, filed Apr. 19, 2018, 2018/0305265, Pfeil et al.

U.S. Appl. No. 10/822,284, filed Nov. 3, 2020, 2018/0290935, Pfeil et al.

(56) References Cited

OTHER PUBLICATIONS

Nehrke et al., "*Coexistence of three calcium carbonate polymorphs in the shell of the Antarctic clam Latemula elliptica*," Geochem. Geophys. Geosyst; 2012, 13:1-8.

* cited by examiner

USE OF AMORPHOUS CALCIUM CARBONATE IN A FIRE-RESISTANT INORGANIC MORTAR SYSTEM BASED ON ALUMINOUS CEMENT TO INCREASE LOAD VALUES AT ELEVATED TEMPERATURES

This application is a National Stage entry under § 371 of international Application No. PCT/EP2018/058065, filed on Mar. 29, 2018, and which claims the benefit of European Application No. 17165410.6, filed on Apr. 7, 2017.

FIELD OF THE INVENTION

The present invention pertains to a use of amorphous calcium carbonate in a fire-resistant inorganic mortar system for a fire-resistant chemical fastening of anchors and post-installed reinforcing bars in mineral substrates, comprising a curable aluminous cement component A and an initiator component B for initiating the curing process, component A further comprising at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water. In particular, the present invention pertains to the use of amorphous calcium carbonate in a fire-resistant inorganic mortar system for a fire-resistant chemical fastening of anchors and post-installed reinforcing bars in mineral substrates to increase load values at elevated temperatures. Moreover, the present invention pertains to a method for a fire-resistant chemical fastening of anchors and post-installed reinforcing bars, preferably of metal anchors and post-installed reinforcing bars, in mineral substrates, such as structures made of brickwork, concrete, pervious concrete or natural stone.

BACKGROUND OF THE INVENTION

Today, there are organic and inorganic mortar systems available, which are used for chemical fastening of anchors and post-installed reinforcing bars. For example, organic systems based on free-radically polymerizable resins are used when fast curing is desired. However, such systems are generally known to be polluting, expensive, potentially hazardous and/or toxic for the environment and for the person who handles them and they often need to be specifically labelled. Moreover, organic systems often show a much reduced or even no stability when thermally exposed to strong sunlight or otherwise elevated temperatures, for example 80-120° C., such as fire, thereby decreasing their mechanical performance when it comes to chemically fastening of anchors and post-installed reinforcing bars. In addition, organic mortar systems often do not possess any sufficient fire-resistance, in particular when anchors and post-installed reinforcing bars are subject to fire and heat.

With regard to fire-resistance of anchors and post-installed reinforcing bars, the assessment is laid down in the acceptance criteria ACI 355.4-11 and AC308, "Qualification of Post-Installed Adhesive Anchors in Concrete (ACI 355.4-11)" from the American Concrete Institute and "Acceptance Criteria for Post-Installed Adhesive Anchors in Concrete Elements (AC308, 2016)" from the ICC Evaluation Service, respectively.

In par. 10.24 of ACI 355.4-11 it is laid down that assessment of resistance to fire exposure shall be based on a recognized national standard for the testing and assessment of structural components under fire conditions. According to R10.24.1 of ACI 355.4-11, anchor testing under fire exposure conditions typically consists of placing a static weight on the anchor in a burn chamber and measuring the time to failure for a specific time-temperature curve. While standards have been issued for the testing and assessment of anchors for exposure to fire, little guidance exists for the use of the resulting resistance values in design.

So, in general, any adhesive anchors could be used for fire design, as long as a standard recognized nationally to qualify them is available. However, in many cities the use of adhesive anchors is rejected and expansion anchors must be used instead, or the adhesive anchor must be sized for reduced allowable load for applicable fire rating.

In order to overcome these drawbacks, predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is resistant to bases and attains its maximum strength more rapidly than Portland cement and is capable of withstanding solutions of sulfates. Hence, aluminous cement systems are preferably employed in the field of chemical anchoring.

There are a few inorganic systems available, such as Cemeforce from Sumitomo Osaka Cement Co Ltd, Japan; a one-component injection system which has to be mixed with water prior to application and two types of Ambex anchoring capsules from Ambex Concrete Repair Solutions, Canada; capsules with cementitious content, which have to be immersed in water prior to use, then inserted into the borehole.

However, these commercially available systems have several drawbacks such as possessing very high dispensing forces, unacceptable handling in mixing, very short working time, risk of leaching of compounds in water bucket, poor insertion of soft/wet capsules into deep boreholes, inhomogeneous content, produce a large scattering of load values as well as having relatively low load values, in particular when it comes to chemically fastening of reinforcement bars and tested for fire-rating, e.g. at 250° C. and higher. Moreover, it is known that the load values drop at higher temperatures, such as 250° C. and higher, when compared to the load values obtained at ambient temperature indicating that these systems are not suitable for a fire-resistant application as well as they cannot guarantee a sufficient anchoring at elevated temperatures which is necessary when fastening anchors and post-installed reinforcing bars.

When it comes to a fire-resistant chemical fastening of anchors and post-installed reinforcing bars in mineral surfaces or substrates, a short working time is not always desired. In particular, when it comes to fastening reinforcement bars having a large embedment depth, the installer dissatisfies as an embedment depth can be up to 2 meters deep and sufficient time buffer is needed. Further, most of the known systems lack sufficient fluidity for most practical applications of the resultant compositions. Often anchors and reinforcement bars must be forced into the borehole which makes the installation very hard and inefficient. Moreover, such prior art compositions also evidence a tendency to crack in a relatively short time and do not exhibit the required mechanical performance, in particular under the influence of elevated temperatures, such as fire.

Therefore, there is a need for a fire-resistant ready-for-use multiple-component system, preferably a fire-resistant two-component system, which is superior over the prior art systems with regard to environmental aspects, health and safety, handling, storage time and a good balance between setting and hardening of the mortar. In particular, it is of great interest to provide a fire-resistant system that can be used for a fire-resistant chemical fastening of anchors and post-installed reinforcing bars in mineral surfaces or substrates without adversely affecting the handling, characteristics and the mechanical performance of the chemical anchoring system, especially at elevated temperatures such as 250° C. and higher.

Therefore, there is a need for a fire-resistant inorganic mortar system, preferably a two-component inorganic mortar system, which is superior over the prior art systems. In particular, it is of interest to provide a system that can be used for a fire-resistant chemical fastening of anchors and post-installed reinforcing bars in mineral substrates without adversely affecting the handling, characteristics and the mechanical performance of the fire-resistant chemical anchoring system. Especially, there is a need for a system that provides increased load values when compared to the known systems, when it comes to a fire-resistant chemical fastening of anchors and post-installed reinforcing bars, even under the influence of elevated temperatures, such as fire. Moreover, fire-resistant multiple-component anchoring system should have load values that do not decrease at higher temperatures, preferably they should even increase at higher temperatures such as 250° C. and higher to guarantee a sufficient anchoring at elevated temperatures which is necessary when fastening anchors and post-installed reinforcing bars.

In addition, there is a need to improve load values by the addition of fillers or particles materials, such as a fire-resistant inorganic chemical anchor, to lower the consumption of more expensive binder material or to improve some properties of the mixed material.

Moreover, it is an object of the present invention to provide a method for a fire-resistant chemical fastening of anchors and post-installed reinforcing bars, preferably of metal anchors and post-installed reinforcing bars, in mineral substrates, such as structures made of brickwork, concrete, pervious concrete or natural stone.

These and other objectives as they will become apparent from the ensuing description of the invention are solved by the present invention as described in various embodiments. Further embodiments are preferred embodiments.

SUMMARY OF THE INVENTION

In one aspect, the present invention pertains to a use of amorphous calcium carbonate in a fire-resistant inorganic mortar system for a fire-resistant chemical fastening of anchors and post-installed reinforcing bars in mineral substrates, comprising a curable aluminous cement component A and an initiator component B for initiating the curing process. Component A further comprises at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water.

In another aspect, the present invention pertains to a use of amorphous calcium carbonate in a fire-resistant inorganic mortar system for a fire-resistant chemical fastening of anchors and post-installed reinforcing bars in mineral substrates to increase load values at elevated temperatures.

Finally, in another aspect, the present invention pertains to a method for a fire-resistant chemical fastening of anchors and post-installed reinforcing bars in mineral substrates, characterized in that a fire-resistant inorganic mortar system is used for fastening, which comprises a curable aluminous cement component A and an initiator component B for initiating the curing process, wherein component A further comprises at least one blocking agent, at least one plasticizer and water, and component B comprising an initiator, at least one retarder, at least one mineral filler and water, and which contains amorphous calcium carbonate. The mineral substrates, are substrates such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates.

Alternative names are "high-alumina cement" or "Ciment fondu" in French. The main active constituent of calcium aluminate cements is monocalcium aluminate ($CaAl_2O_4$, $CaO.Al_2O_3$, or CA in the cement chemist notation).

The term "initiator" in the context of the present invention refers to a compound or composition that modifies the chemical environment to start a particular chemical reaction. In the present invention the initiator modifies the pH-value of the mortar suspension thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar suspension thereby delaying the hydraulic binder action in the final mixture.

The term "initial set-time" in the context of the present invention refers to the time at which the mixture of component A and component B starts to set after mixing. During the time period after mixing, the mixture stays in the form of a more or less fluid aqueous suspension or paste of solid products.

It has been surprisingly found out by the inventors, that the addition of an amorphous calcium carbonate to an inorganic mortar system for a fire-resistant chemical fastening of anchors and post-installed reinforcing bars in mineral substrates, comprising a curable aluminous cement component, preferably based on calcium aluminate cement, results in a significant increase of load values at elevated temperatures, such as 250° C. and higher, when compared to a system not comprising any amorphous calcium carbonate. It has also been found out that the addition of an amorphous calcium carbonate does not adversely affecting the handling, characteristics and the mechanical performance of the chemical anchoring system, especially when applied over a long period of time as well as at elevated temperatures, such as 250° C. and higher.

In particular, it has been found out, that the natural, fine, amorphous calcium carbonate, produced from the pure, microcrystalline champagne-chalk (from the area of *Cham-*

*pagne crayeuse*) plays an important role in the increase of load values at elevated temperatures. Such an amorphous calcium carbonate is commercially available under the name Industrie Spezial® from Omya International AG, Germany.

Therefore, the present invention pertains to a use of amorphous calcium carbonate in a fire-resistant inorganic mortar system for a fire-resistant chemical fastening of anchors and post-installed reinforcing bars in mineral substrates, comprising a curable aluminous cement component A and an initiator component B in for initiating the curing process. In particular, component A further comprises at least one blocking agent selected from the group consisting of phosphoric acid, metaphosphoric acid, phosphorous acid and phosphonic acids, at least one plasticizer and water, and component B comprises an initiator, at least one retarder, at least one mineral filler and water.

Component A as used in the present invention is based on an aluminous cement (CA) or a calcium sulfoaluminate cement (CAS). The aluminous cement component which can be used in the present invention is preferably an aluminous cement component based on an aqueous-phase calcium aluminate cement (CAC). The aluminous cement to be used in the present invention is characterized by rapid set and rapid hardening, rapid drying, excellent resistance to corrosion and shrinkage. Such a calcium aluminate cement suitable to be used in the present invention is for example Ternal® White (Kerneos, France).

If component A comprises a mixture of aluminous cement (CAC) and calcium sulfate ($CaSO_4$), rapid ettringite formation takes place during hydration. In concrete chemistry hexacalcium aluminate trisulfate hydrate, represented by the general formula $(CaO)_6(Al_2O_3)(SO_3)_3.32\ H_2O$ or $(CaO)_3(Al_2O_3)(CaSO_4)_3.32H_2O$, is formed by the reaction of calcium aluminate with calcium sulfate, resulting in quick setting and hardening as well as in shrinkage compensation or even expansion. With moderate increase of the sulfate content shrinkage compensation can be achieved.

Component A as used in the present invention comprises at least about 40 wt.-%, preferably at least about 50 wt.-%, more preferably at least about 60 wt.-%, most preferably at least about 70 wt.-%, from about 40 wt.-% to about 95 wt.-%, preferably from about 50 wt.-% to about 85 wt.-%, more preferably from about 60 wt.-% to about 80 wt.-%, most preferably from about 70 wt.-% to about 78 wt.-% of aluminous cement, based on the total weight of component A.

According to an alternative embodiment of the invention, component A as used comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the two-component mortar system of the present invention, the ratio of $CaSO_4$/CAC of component A should be less or equal to 35:65.

The blocking agent comprised in component A as used in the present invention is selected from the group consisting of phosphoric acid, metaphosphoric acid, phosphorous acid and phosphonic acids, preferably is phosphoric acid or metaphosphoric acid, most preferably is phosphoric acid, in particular an 85% aqueous solution of phosphoric acid. Component A comprises at least about 0.1 wt.-%, preferably at least about 0.3 wt.-%, more preferably at least about 0.4 wt.-%, most preferably at least about 0.5 wt.-%, from about 0.1 wt.-% to about 20 wt.-%, preferably from about 0.1 wt.-% to about 15 wt.-%, more preferably from about 0.1 wt.-% to about 10 wt.-%, most preferably from about 0.3 wt.-% to about 10 wt.-% of said blocking agent, based on the total weight of component A. In a preferred embodiment, component A comprises from about 0.3 wt.-% to about 10 wt.-% of 85% aqueous solution of phosphoric acid, based on the total weight of component A. Preferably, the amounts of aluminous cement and/or calcium sulfoaluminate cement by weight relative to the hydraulic binder total weight are higher than any of the following values: 50%, 60%, 70%, 80%, 90%, 95%, 99% or are 100%.

The plasticizer comprised in component A as used in the present invention is selected from the group consisting of low molecular weight (LMW) polyacrylic acid polymers, superplasticizers from the family of polyphosphonate polyox and polycarbonate polyox, and ethacryl superplasticizers from the polycarboxylate ether group, and mixtures thereof, for example Ethacryl™ G (Coatex, Arkema Group, France), Acumer™ 1051 (Rohm and Haas, U.K.), or Sika® ViscoCrete®-20 HE (Sika, Germany). Suitable plasticizers are commercially available products. Component A comprises at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 5 wt.-% of said plasticizer, based on the total weight of component A.

In an advantageous embodiment, component A as used in the present invention further comprises the following characteristics, taken alone or in combination.

Component A may additionally comprise a thickening agent. The thickening agents which can be used in the present invention may be selected from the group consisting of organic products, such as xanthan gum, welan gum or DIUTAN® gum (CPKelko, USA), starched-derived ethers, guar-derived ethers, polyacrylamide, carrageenan, agar agar, and mineral products, such as clay, and their mixtures. Suitable thickening agents are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.3 wt.-% to about 0.7 wt.-% of said thickening agent, based on the total weight of component A.

Component A may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France) and Nuosept OB 03

(Ashland, The Netherlands). Component A comprises at least about 0.001 wt.-%, preferably at least about 0.005 wt.-%, more preferably at least about 0.01 wt.-%, most preferably at least about 0.015 wt.-%, from about 0.001 wt.-% to about 1.5 wt.-%, preferably from about 0.005 wt.-% to about 0.1 wt.-%, more preferably from about 0.01 wt.-% to about 0.075 wt.-%, most preferably from about 0.015 wt.-% to about 0.03 wt.-% of said antibacterial or biocidal agent, based on the total weight of component A. In a preferred embodiment, component A comprises from about 0.015 wt.-% to about 0.03 wt.-% of Nuosept OB 03, based on the total weight of component A.

In an alternative embodiment, component A comprises at least one filler, in particular an organic or mineral filler. The filler which can be used in the present invention may be selected from the group consisting of quartz powder, preferably quartz powder having an averaged grain size (d50%) of about 16 μm, quartz sand, clay, fly ash, fumed silica, carbonate compounds, aluminas, pigments, titanium oxides, light fillers, and their mixtures. Suitable mineral fillers are commercially available products. Exemplarily mentioned is quartz powder Millisil W12 or W6 (Quarzwerke GmbH, Germany). Component A comprises at least about 1 wt.-%, preferably at least about 2 wt.-%, more preferably at least about 5 wt.-%, most preferably at least about 8 wt.-%, from about 1 wt.-% to about 50 wt.-%, preferably from about 2 wt.-% to about 40 wt.-%, more preferably from about 5 wt.-% to about 30 wt.-%, most preferably from about 8 wt.-% to about 20 wt.-% of said at least one filler, based on the total weight of component A.

The water content comprised in component A as used in the present invention is at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-%, based on the total weight of component A.

The presence of a plasticizer, thickening agent as well as an antibacterial or biocidal agent does not change the overall inorganic nature of the cementitious component A.

Component A comprising the aluminous cement or calcium sulfoaluminate cement is present in aqueous-phase, preferably in form of a slurry or paste.

The amorphous calcium carbonate used in the inorganic mortar system for a fire-resistant chemical fastening of anchors and post-installed reinforcing bars in mineral substrates according to the present invention, is preferably in the form of an amorphous calcium carbonate having an average particle size (d50%) in the range of from 1.2 to 2.8 μm, more preferably of from 1.5 to 2.5 μm, most preferably has an average particle size of 2.4 μm.

The amorphous calcium carbonate used in the present invention is further characterized by a top cut (d98%) in the range of from 1.0 to 30 μm, preferably of from 5.0 to 25 μm, more preferably has a top cut (d98%) of 20 μm.

The amorphous calcium carbonate used in the present invention is further characterized by a percentage of particles <2 μm in the range of from 30 to 70, preferably of from 30 to 60, more preferably by a percentage of particles <2 μm of 30.

The calcium carbonate used in the present invention is further characterized by a residue in the range between of from 0.01 to 0.3%, preferably of from 0.02 to 0.3%, more preferably has a residue of 0.3%, on a 45 μm sieve (determined according to ISO 787/7).

The amorphous calcium carbonates that can be used in the present invention are commercially available amorphous calcium carbonates, such for example from Omya International AG, Germany, like as Industrie Spezial®.

Preferably, the amorphous calcium carbonate used according to the present invention, is comprised in the initiator component B of the inorganic mortar system. In a preferred embodiment of the present invention, the amorphous calcium carbonate is comprised in initiator component B further comprising an initiator, at least one retarder, at least one mineral filler and water. The addition of amorphous calcium carbonate to the inorganic mortar system, such as a fire-resistant inorganic chemical anchor, is to lower the consumption of more expensive binder material and to improve some properties of the mixed material, especially to increase the load values at elevated temperatures.

It is particular preferred that component B as used in the present invention comprises at least about 1 wt.-%, preferably at least about 2. wt.-%, more preferably at least about 3 wt.-%, most preferably at least about 4 wt.-%, from about 1 wt.-% to about 30 wt.-%, preferably from about 2 wt.-% to about 25 wt.-%, more preferably from about 3 wt.-% to about 20 wt.-%, most preferably from about 4 wt.-% to about 12 wt.-% of amorphous calcium carbonate having an average particle size in the range of from 1 to 3 μm, based on the total weight of component B.

Component B as used in the present invention comprises an initiator, at least one retarder, at least one mineral filler and water. To ensure a sufficient processing time, whereby the initial-set time is at least 5 min or more, at least one retarder, which prevents premature hardening of the mortar composition, is used in a distinct concentration in addition to the initiator component.

The initiator present in component B is comprised of an activator component and an accelerator component which comprise a mixture of alkali and/or alkaline earth metal salts.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate, calcium formate or calcium phosphate, a sodium metal salt, such as sodium hydroxide, sodium sulfate, sodium carbonate or sodium phosphate, or a lithium metal salt, such as lithium hydroxide, lithium sulfate, lithium carbonate or lithium phosphate, most preferably is lithium hydroxide. In one preferred embodiment the lithium hydroxide used in component B is a 10% aqueous solution of lithium hydroxide.

Component B comprises at least about 0.01 wt.-%, preferably at least about 0.02 wt.-%, more preferably at least about 0.05 wt.-%, most preferably at least about 1 wt.-%, from about 0.01 wt.-% to about 40 wt.-%, preferably from about 0.02 wt.-% to about 35 wt.-%, more preferably from about 0.05 wt.-% to about 30 wt.-%, most preferably from about 1 wt.-% to about 25 wt.-% of said activator, based on the total weight of component B. In a particular preferred embodiment, the activator is comprised of water and lithium hydroxide. The water content comprised in component B is at least about 1 wt.-%, preferably at least about 5 wt.-%, more preferably at least about 10 wt.-%, most preferably at least about 20 wt.-%, from about 1 wt.-% to about 60 wt.-%, preferably from about 5 wt.-% to about 50 wt.-%, more preferably from about 10 wt.-% to about 40 wt.-%, most preferably from about 15 wt.-% to about 30 wt.-%, based on the total weight of component B. The lithium hydroxide content comprised in component B is at least about 0.1 wt.-%, preferably at least about 0.5 wt.-%, more preferably at least about 1.0 wt.-%, most preferably at least about 1.5 wt.-%, from about 0.1 wt.-% to about 5 wt.-%, preferably from about 0.5 wt.-% to about 4 wt.-%, more preferably from about 1.0 wt.-% to about 3 wt.-%, most preferably from about 1.5 wt.-% to about 2.5 wt.-%, based on the total weight of component B. In a most preferred embodiment, component B comprises from about 2.0 wt.-% to about 20 wt.-% of a 10% aqueous solution of lithium hydroxide, based on the total weight of component B.

The accelerator component is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium chloride, calcium formate or calcium phosphate, a sodium metal salt, such as sodium hydroxide, sodium sulfate, sodium carbonate, sodium chloride, sodium formate or sodium phosphate, or a lithium metal salt, such as lithium hydroxide, lithium sulfate, lithium sulfate monohydrate, lithium carbonate, lithium chloride, lithium formate or lithium phosphate, most preferably is lithium sulfate or lithium sulfate monohydrate. Component B comprises at least about 0.01 wt.-%, preferably at least about 0.05 wt.-%, more preferably at least about 0.1 wt.-%, most preferably at least about 1.0 wt.-%, from about 0.01 wt.-% to about 25 wt.-%, preferably from about 0.05 wt.-% to about 20 wt.-%, more preferably from about 0.1 wt.-% to about 15 wt.-%, most preferably from about 1.0 wt.-% to about 10 wt.-% of said accelerator, based on the total weight of component B.

In a particular preferred embodiment of component B as used in the present invention, the ratio of 10% aqueous solution of lithium hydroxide/lithium sulfate or lithium sulfate monohydrate is in the range of from 10/1 to 6/1.

The at least one retarder comprised in component B as used in the present invention is selected from the group consisting of citric acid, tartaric acid, lactic acid, salicylic acid, gluconic acid and mixtures thereof, preferably is a mixture of citric acid and tartaric acid. Component B comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of component B.

In a particular preferred embodiment of component B as used in the present invention, the ratio of citric acid/tartaric acid is 1.6/1.

The at least one mineral filler in addition to the amorphous calcium carbonate comprised in component B as used in the present invention is selected from the group consisting of limestone fillers, sand, alumina, crushed stones, gravels, pebbles and mixtures thereof, preferred are limestone fillers, such as various calcium carbonates. The at least one mineral filler is preferably selected from the group consisting of limestone fillers or quartz fillers, such as quartz powder Millisil W12 or W6 (Quarzwerke GmbH, Germany) and quartz sand. The at least one mineral filler of component B is most preferably a calcium carbonate or a mixture of calcium carbonates. Component B comprises at least about 30 wt.-%, preferably at least about 40 wt.-%, more preferably at least about 50 wt.-%, still more preferably at least about 60 wt.-%, most preferably at least about 70 wt.-%, from about 30 wt.-% to about 95 wt.-%, preferably from about 35 wt.-% to about 90 wt.-%, more preferably from about 40 wt.-% to about 85 wt.-%, still more preferably from about 45 wt.-% to about 80 wt.-%, most preferably from about 50 wt.-% to about 75 wt.-% of at least one mineral filler, based on the total weight of component B.

It is preferred that the at least one mineral filler has an average particle size of not more than 500 µm, more preferably of not more than 400 µm, most preferably not more than 350 µm.

In a particular preferred embodiment, the at least one mineral filler comprised in component B is mixture of three different calcium carbonates, i.e. calcium carbonate fines, such as different Omyacarb® types (Omya International AG, Germany). Most preferably, the first calcium carbonate has an average particle size (d50%) of about 3.2 µm and a residue of 0.05% on a 45 µm sieve (determined according to ISO 787/7). The second calcium carbonate has an average particle size (d50%) of about 7.3 µm and a residue of 0.5% on a 140 µm sieve (determined according to ISO 787/7). The third calcium carbonate has an average particle size (d50%) of about 83 µm and a residue of 1.0% on a 315 µm sieve (determined according to ISO 787/7). In a particular preferred embodiment of component B, the ratio of first calcium carbonate/second calcium carbonate/third calcium carbonate is 1/2.6/4.

In a particular preferred alternative embodiment, the at least one mineral filler comprised in component B is mixture of three different quartz fillers. Most preferably, the first quartz filler is a quartz sand having an average particle size (d50%) of about 240 µm. The second quartz filler is a quartz powder having an average grain size (d50%) of about 40 µm. The third quartz filler is a quartz powder having an average grain size (d50%) of about 15 µm. In a particular preferred embodiment of component B as used in the present invention, the ratio of first quartz filler/second quartz filler/third quartz filler is 3/2/1.

In an advantageous embodiment, component B further comprises the following characteristics, taken alone or in combination.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMH EC), sodium carboxymethyl cellulose (SCMC), sodium carboxymethyl 2-hydroxyethyl cellulose,2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.2 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.2 wt.-% to about 1 wt.-% of said thickening agent, based on the total weight of component B.

The presence of a retarder and thickening agent does not change the overall inorganic nature of the cementitious component B.

Component B comprising the initiator and retarder is present in aqueous-phase, preferably in form of a slurry or paste.

It is preferred that the pH-value of component B is above 10, more preferably above 11 and most preferably is above 12, in particular in the range between 10 and 14, preferably between 11 and 13.

It is particular preferred that the proportions of water in the two components, namely component A and component B, are chosen so that the water to aluminous cement ratio (W/CAC) or water to calcium sulfoaluminate cement (W/CAS), in the product obtained by mixing components A and B is lower than 1.5, preferably between 0.2 and 1.2, most preferably between 0.3 and 1.1. In a preferred embodiment, the ratio of water to calcium aluminate cement comprising calcium sulfate (W/(CAC+CaSO$_4$)) in the product obtained by mixing components A and B is 1.0.

Moreover, it is particular preferred that the proportion of lithium in component B is chosen so that the lithium to aluminous cement ratio (Li/CAC) and lithium to calcium sulfoaluminate cement (Li/CAS), in the product obtained by mixing components A and B is lower than 0.05, preferably between 0.001 and 0.05, most preferably between 0.005 and 0.01. In a particular preferred embodiment, the proportion of lithium hydroxide in component B is chosen so that the ratio of calcium aluminate cement comprising calcium sulfate to lithium hydroxide ((CAC+CaSO4)/LiOH) in the product obtained by mixing components A and B is in the range of from 1.3:1 to 12.5:1.

It is particular preferred that the amorphous calcium carbonate in the product obtained by mixing components A and B is present in the range of from about 1.0 wt.-% to 15.0 wt.-%, preferably from about 1.5 wt.-% to 14.0 wt.-%, more preferably from about 2.0 wt.-% to 13.0 wt.-%, most preferably from about 3.0 wt.-% to 10.0 wt.-%.

Moreover, it is particular preferred that the proportion of retarder in component B is chosen so that the citric acid/tartaric acid to aluminous cement ratio and citric acid/tartaric acid to calcium sulfoaluminate cement, in the product obtained by mixing components A and B is lower than 0.5, preferably between 0.005 and 0.4, most preferably between 0.007 and 0.3.

In a most preferred embodiment, component A comprises or consists of the following components:
70 to 80 wt.-% of aluminous cement, alternatively 40 to 60 wt.-% aluminous cement and 15 to 25 wt.-% calcium sulfate,
0.5 to 1.5 wt.-% of phosphoric acid,
0.5 to 1.5 wt.-% of plasticizer,
0.001 to 0.05 wt.-% of an antimicrobial or biocidal agent, optionally 5 to 20 wt.-% of mineral fillers, and 15 to 25 wt.-% of water.

In a most preferred embodiment, component B comprises or consists of the following components:
4.0 wt.-% to 20 wt.-% of an amorphous calcium carbonate,
0.1 wt.-% to 4 wt.-% of lithium hydroxide,
0.1 wt.-% to 5 wt.-% of lithium sulfate or lithium sulfate monohydrate,
0.05 wt.-% to 5 wt.-% of citric acid,
0.05 wt.-% to 4 wt.-% of tartaric acid,
35 wt.-% to 45 wt.-% of a first mineral filler,
15 wt.-% to 30 wt.-% of a second mineral filler,
5.0 wt.-% to 20 wt.-% of a third mineral filler,
0.01 wt.-% to 0.5 wt.-% of a thickening agent, and
15 wt.-% to 25 wt.-% of water.

Component A as used in the present invention may be prepared as follows: The phosphor-containing blocking agent is mixed with water, so that the pH-value of the resulting mixture is about 2. Plasticizer is added and the mixture homogenized. Aluminous cement, optionally calcium sulfate, and optionally mineral filler are premixed and added stepwise to the mixture whilst increasing the stirring speed, so that the pH-value of the resulting mixture is about 4. Finally, thickening agent and antibacterial/biocidal agent are added and mixed until complete homogenization of the mixture.

Component B as used in the present invention may be prepared as follows: The accelerator is dissolved in an aqueous solution of an activator, followed by subsequent addition of retarder and homogenization of the mixture. The filler(s) is/are added stepwise whilst increasing the stirring speed until the mixture homogenizes. Finally, the thickening agent is added until complete homogenization of the mixture.

Component A and B are present in aqueous phase, preferably in form of a slurry or paste. In particular, components A and B have a pasty to fluid aspect according to their respective compositions. In one preferred embodiment, component A and component B are in paste form thereby preventing sagging at the time of mixing the two components.

The weight ratio between component A and component B (A/B) is preferentially comprised between 7/1 and 1/3, preferably is 1/3. Preferably, the composition of the mixture comprises 25 wt.-% of component A and 75 wt.-% of component B. In an alternative embodiment, the composition of the mixture comprises 75 wt.-% of component A and 25 wt.-% of component B.

The fire-resistant inorganic mortar system, preferably the fire-resistant two-component inorganic mortar system, is of mineral nature, which is not affected by the presences of additional thickening agents of other agents.

It is preferred that the fire-resistant inorganic mortar system has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component fire-resistant inorganic mortar system, especially the fire-resistant two-component inorganic mortar system, the volume ratio of cementitious component A to initiator component B is 1:1 to 7:1, preferably is 3:1. In an alternative embodiment, the volume ratio of cementitious component A to initiator component B is 1:3 to 1:2.

After being produced separately, component A and component B are introduced into separate containers, from which they are ejected by means of mechanical devices and are guided through a mixing device. The inorganic mortar system is preferably a ready-for-use system, whereby component A and B are separately arranged from each other in a multi-chamber device, such as a multi-chamber cartridge and/or a multi-chamber cylinder or in two-component capsules, preferably in a two-chamber cartridge or in two-component capsules. The multi-chamber system preferably includes two or more foil bags for separating curable component A and initiator component B. The contents of the chambers or bags which are mixed together by a mixing device, preferably via a static mixer, can be injected into a borehole. The assembly in multiple chamber cartridges or pails or sets of buckets is also possible.

The hardening aluminous cement composition existing from the static mixer is inserted directly into the borehole, which is required accordingly for fastening the anchors and post-installed reinforcing bars, and has been initially introduced into the mineral substrate, during the fire-resistant chemical fastening of anchors and post-installed reinforcing bars, whereupon the construction element to be fastened, for example an anchor rod, is inserted and adjusted, whereupon the mortar composition sets and hardens. In particular, the fire-resistant inorganic mortar system is to be considered as a fire-resistant chemical anchor for fastening metal anchors and post-installed reinforcing bars.

Without being bound by theory, the blocking agent present in component A inhibits the solubilization of the calcium aluminate(s) in water, thereby stopping cement hydration which leads to the curing of the mixture. Upon adding the initiator component B, the pH-value is changed and the cementitious component A is unblocked and hydration reaction of the calcium aluminate(s) is released. As this hydration reaction is catalyzed and accelerated by the presence of alkali metals salts, in particular lithium salts, it has an initial set-time of shorter than 5 min. In order to retard the fast curing time (initial-set time), it is preferred that the at least one retarder comprised in component B as used in the present invention is so chosen to obtain an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

The role of amorphous calcium carbonate is considered to be a source of easily available soluble calcium carbonate resulting in additional post-curing of the cured mixture when being exposed to heat like in the case of fire, resulting in increased degree of hydration, thereby increasing the mechanical strength of the cured mixture.

The role of the mineral fillers in addition to the amorphous calcium carbonate, in particular in component B, is to further adjust the final performance with regard to mechanical strength and performance as well as long term durability. By optimizing the fillers, it is possible to optimize the water/aluminous cement ratio which allows for an efficient and fast hydration of the aluminous cement.

The fire-resistant inorganic mortar system comprising the amorphous calcium carbonate can be used for a fire-resistant chemical fastening of anchors and post-installed reinforcing bars, preferably of metal anchors and post-installed reinforcing bars, such as anchor rods, in particular threaded rods, bolts, steel reinforcement bars or the like into mineral substrates, such as structures made of brickwork, concrete, pervious concrete or natural stone. In particular, the fire-resistant inorganic mortar system can be used for a fire-resistant chemical fastening of anchors and post-installed reinforcing bars, such as metal anchors and post-installed reinforcing bars, in boreholes. It has been found out, that the use of amorphous calcium carbonate in such a fire-resistant inorganic mortar system significantly increases the load values and hence load capacity in boreholes at elevated temperatures, such as 250° C. and higher. An increased temperature resistance results in a better operational capability for anchoring purposes at higher temperatures, such as temperatures being present in the area of a borehole of facade anchorages, which are exposed to strong sunlight or otherwise elevated temperatures, such as fire. In particular, the fire-resistant two-component mortar system of the present invention has load values that do not decrease at higher temperatures, they even increase at higher temperatures such as 250° C. and higher when compared to the known systems, to guarantee a sufficient anchoring at elevated temperatures which is necessary when fastening anchors and post-installed reinforcing bars.

Hence, the use of amorphous calcium carbonate according to the present invention, in addition to mineral fillers present in the inorganic mortar system, is particular to increase load values at elevated temperatures, such as 250° C. and higher. Moreover, the addition of amorphous calcium carbonate to materials, such as a fire-resistant inorganic chemical anchors, is advantageous to lower the consumption of more expensive binder material or to improve some properties of the mixed material.

The amorphous calcium carbonate comprised in the inorganic mortar is particularly applied in a method for a fire-resistant chemical fastening of anchors and post-installed reinforcing bars, preferably of metal anchors and post-installed reinforcing bars, in mineral substrates, such as structures made of brickwork, concrete, pervious concrete or natural stone.

Moreover, the fire-resistant inorganic mortar system comprising the amorphous calcium carbonate may be used for the fire-resistant attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchors and post-installed reinforcing bars, preferably metal anchors and post-installed reinforcing bars, such as anchor rods, in particular threaded rods, bolts, steel reinforcement bars or the like into recesses, such as boreholes, in mineral substrates, such as structures made of brickwork, concrete, pervious concrete or natural stone, whereby the components of the two-component inorganic mortar system are prior mixed, for example by means of a static mixer or by destroying a cartridge or a plastic bag, or by mixing components of a multi-chamber pails or sets of buckets.

The following example illustrates the invention without thereby limiting it.

EXAMPLES

1. Preparation of Component A and Component B

The cementitious component A as well as the initiator component B of the inventive example 1 and comparative examples 2 to 5 and of are initially produced by mixing the constituents specified in Tables 1 and 2, respectively. The proportions that are given are expressed in wt.-%.

A typical mixing protocol for component A is as follows: weighting out the necessary quantity of water, introducing the water into a mixing bowl and slowly adding phosphoric acid thereto under stirring with a dissolver plate at 150 rpm for 2 minutes; adding plasticizer and homogenizing at 150 to 200 rpm for 2-3 minutes; adding the aluminous cement (Ternal White®) step by step whilst increasing the stirring speed continuously with increasing viscosity from 200 rpm to 2000 rpm to avoid lump formation, after addition stirring under vacuum (150 mbar) at dissolver plate speed of 2000 rpm and bar stirrer speed of 220 rpm for 5 minutes; adding slowly thickening agent and stirring at dissolver plate speed of 3000 rpm and bar stirrer speed of 220 rpm for 3-5 minutes; adding antibacterial or biocidal agent and homogenizing under vacuum (150 mbar) at dissolver plate speed of 3000 rpm and bar stirrer speed of 440 rpm for 5 minutes; finally stirring under vacuum (100 mbar) at dissolver plate speed of 1500 rpm and bar stirrer speed of 220 rpm for 10 minutes.

TABLE 1

Composition of component A.

| Compound | Function | Component name A0 |
|---|---|---|
| Deionized water | solvent | 20.00 |
| Phosphoric acid 85% | blocking agent | 0.91 |
| Ethacryl G | plasticizer | 0.6 |
| Ternal White | aluminate cement | 77.98 |
| Xanthan Gum | thickening agent | 0.50 |
| Nuosept OB 03 | biocidal agent | 0.01 |

Phosphoric acid 85% marketed by Sigma-Aldrich Chemie GmbH, Germany; Ethacryl G marketed by Coatex S.A., France; Ternal White ® marketed by Kerneos S.A., France; Xanthan Gum marketed by Kremer Pigmente GmbH & CO. KG, Germany; Nuosept OB 03 marketed by Ashland Nederland B.V., The Netherlands.

A typical mixing protocol for component B is as follows: dissolving lithium sulfate monohydrate in a 10% aqueous solution of lithium hydroxide and water followed by dissolving citric acid and tartaric acid in this mixture and fully homogenizing it at 400 rpm; adding stepwise filler, starting with the roughest filler and ending with the finest one, adding the calcium carbonate with the respective particle size ranging of from 1 to 3 µm while increasing stirring speed from 250 rpm to 1700 rpm and continuing homogenizing it at 1700 rpm for 2-3 min; finally adding thickening agent whilst stirring, and increasing stirring speed to 2200 rpm; finally continuing homogenizing at 2200 rpm for 5 min.

TABLE 2

Composition of component B.

| Compound | Function/ Property | Inventive Example (Component name) B0 | Comparative Examples (Component names) | | | |
|---|---|---|---|---|---|---|
| | | | B1 | B2 | B3 | B4 |
| LiOH 10% (water) | activator | 2.31 | 2.31 | 2.31 | 2.31 | 2.31 |
| Li$_2$SO$_4$ monohydrate | accelerator | 0.23 | 0.23 | 0.23 | 0.23 | 0.23 |
| Water | solvent | 17.03 | 17.03 | 17.03 | 17.03 | 17.03 |
| Citric acid | retarder | 0.18 | 0.18 | 0.18 | 0.18 | 0.18 |
| Tartaric acid | retarder | 0.11 | 0.11 | 0.11 | 0.11 | 0.11 |

TABLE 2-continued

Composition of component B.

| Compound | Function/ Property | Inventive Example (Component name) B0 | Comparative Examples (Component names) | | | |
|---|---|---|---|---|---|---|
| | | | B1 | B2 | B3 | B4 |
| [1]Filler 1 | d50% = 83 µm | 37.73 | 37.73 | 37.73 | 37.73 | 37.73 |
| [2]Filler 2 | d50% = 7.3 µm | 24.77 | 24.77 | 24.77 | 24.77 | 24.77 |
| [3]Filler 3 | d50% = 3.2 µm | 9.43 | 17.44 | 9.43 | 9.43 | 9.43 |
| [4]Amorphous CaCO$_3$ | d50% = 2.4 µm | 8.01 | — | — | — | — |
| [5]Fine CaCO$_3$ | d50% = 2.7 µm | — | — | 8.01 | — | — |
| [6]Fine CaCO$_3$ | d50% = 2.4 µm | — | — | — | 8.01 | — |
| [7]Fine CaCO$_3$ | d50% = 1.8 µm | — | — | — | — | 8.01 |
| Optigel WX | thickening agent | 0.2 | 0.2 | 0.2 | 0.2 | 0.2 |

LiOH 10% (water) marketed by Bernd Kraft GmbH, Germany; Li$_2$SO$_4$ monohydrate marketed by Alfa Aesar GmbH & Co. KG, Germany; Citric acid marketed by Sigma-Aldrich Chemie GmbH, Germany; Tartaric acid marketed by BCD Chemie GmbH, Germany;

[1]Omyacarb 130-Al,

[2]Omyacarb 15-H Al,

[3]Omyacarb 2-Al,

[4]Amourphous CaCO$_3$ Industrie Spezial,

[5]Durcal 2,

[6]OmyaBrite 1300X-OM and

[7]OmyaWhite 18-OM marketed by Omya International AG, Germany; Optigel WX marketed by BYK Chemie GmbH, Germany.

2. Determination of Mechanical Performance

The tests were performed in uncracked concrete C20/25. The concrete used for testing complies with EN 206 and meets the requirements of ETAG 001 Annex A. For installation purposes the borehole was drilled (borehole diameter 16 mm) and cleaned, the mortar injected and the reinforcement bar injected at normal ambient temperature in accordance with the MPII. After being produced separately, the cementitious component A and initiator component B of the comparative examples and inventive example, respectively, were introduced into a hard cartridge and introduced into the borehole via a static mixer in a volume ratio of 1:3. All samples were introduced into the borehole using a dispenser unit. The borehole was created by hammer drilling.

The diameter of the rebar was equal to 12 mm. The embedment depth of the rebar was equal to 120 mm. In the test, the curing time of the samples at room temperature was 24 hours and then the concrete block with the reinforcement bars was placed in an oven and heated to 250° C. Pull-out tests were performed at 250° C. after 3 days of maintaining said temperature.

The average failure load is determined by centrally pulling out the rebar with tight support using a hydraulic tool. Four reinforcement bars are doweled in place in each case and their load values are determined after curing for 3 days at 250° C. as mean value. Ultimate failure loads are calculated as bond strengths and given in N/mm$^2$ in Table 3.

TABLE 3

Bond strengths in N/mm².

| Mixing ratio A:B 1:3 | Inventive Example | Comparative Examples | | | |
|---|---|---|---|---|---|
| Example No. | 1 | 2 | 3 | 4 | 5 |
| Components | A0 + B0 | A0 + B1 | A0 + B2 | A0 + B3 | A0 + B4 |
| Curing time 1 day at room temperature | 5.2 | 4.8 | 4.4 | 6.1 | 5.3 |
| 250° C. in service temperature | 10.5 | 6.1 | 5.6 | 6.7 | 8.2 |

As it can be seen from Table 3, the inventive system shows considerable bond strength after 3 days at 250° C. In comparison to the comparative examples, which contains crystalline calcium carbonate, it can be seen that the inventive system has a strong post-curing effect at elevated temperatures, which results in very high load values, whereas the crystalline calcium carbonate containing system does.

The inventive system exhibits an increased bond strength at 250° C. of at least 5 N/mm² when compared to the bond strength achieved after 1 day at ambient temperature indicating a desired post-cure effect instead of weakening the binder matrix by the elevated temperature. The inventive system shows an increased load value and hence, improved mechanical strength when it comes to a fire-resistant chemical fastening of anchors and post-installed reinforcing bars, in comparison to the comparative system does not comprising any amorphous calcium carbonate. The addition of amorphous calcium carbonate results in a significant increase of load values when compared to systems not comprising any amorphous calcium carbonate. Moreover, it has been shown that the performance improves significantly in boreholes when high load values are desired. Furthermore, it was found that the inventive systems comprising amorphous calcium carbonate do not show any micro-cracks after curing. Hence, the inventive systems provide for a dense, sealed anchoring system which is an important precondition for obtaining improved corrosion and freeze-thaw resistance as well as provide for high load values at elevated temperatures.

Further, in comparison to injection mortars based on organic resins, their bond strength at elevated temperatures show significant, non-acceptable decrease in load values, at 250° C. sometimes close to zero in the organic systems, whereas the inventive example increases in their bond strengths. As it has been shown above, the fire-resistant two-component mortar system comprising the amorphous calcium carbonate of the present invention provides mechanical strength comparable to those of the organic systems, but the essentially mineral composition thereof makes it far less toxic and very little polluting for the environment as well as allows for a more cost-effective production than of the known system of the prior art.

Further, it has been shown, that the fire-resistant multiple-component system, in particular a fire-resistant two-component mortar system, overcomes the disadvantages of the prior art systems. In particular, the fire-resistant two-component mortar system that is ready-for-use, is handled easily and is eco-friendly, can be stably stored for a certain period of time prior to use, exhibits a good balance between setting and hardening and still has an excellent mechanical performance when it comes to a fire-resistant chemical fastening of anchors and post-installed reinforcing bars, even under the influence of elevated temperatures, such as fire. Moreover, fire-resistant multiple-component anchoring system has load values that increase at higher temperatures such as 250° C. to guarantee a sufficient anchoring at elevated temperatures which is necessary when fastening anchors and post-installed reinforcing bars.

Finally, as it has been shown above, the addition of amorphous calcium carbonate to materials, such as a fire-resistant inorganic chemical anchors, results in an increase of load values and at the same time lowers the consumption of more expensive binder material and improves some properties of the mixed material, for example provides a dense, sealed anchoring system which is an important precondition for obtaining improved corrosion and freeze-thaw resistance.

The invention claimed is:

1. A fire-resistant inorganic mortar system, comprising:
   a curable aluminous cement component A comprising at least one blocking agent and at least one plasticizer,
   an initiator component B for initiating curing process comprising an initiator, at least one retarder, at least one mineral filler and water, and
   1-15 wt. % of amorphous calcium carbonate, based on a mixture of components A and B,
   wherein the at least one blocking agent is selected from the group consisting of phosphoric acid, metaphosphoric acid, phosphorous acid, and phosphonic acid,
   wherein the initiator component B comprises a mixture of alkali and/or alkaline earth metal salts,
   wherein the at least one retarder is selected from the group consisting of citric acid, tartaric acid, lactic acid, salicylic acid, gluconic acid, and mixtures thereof, and
   wherein the at least one mineral filler is selected from the group consisting of limestone fillers, sand, corundum, dolomite, alkaline-resistant glass, crushed stones, gravels, pebbles, and mixtures thereof,
   wherein the fire-resistant inorganic mortar system is suitable for chemically fastening of anchors and post-installed reinforcing bars in mineral substrates and said inorganic mortar system has an initial set-time of at least 10 min.

2. The fire-resistant inorganic mortar system according to claim 1, wherein the curable aluminous cement component A is an aluminous cement component based on an aqueous-phase calcium aluminate cement.

3. The fire-resistant inorganic mortar system according to claim 1, wherein the amorphous calcium carbonate has a residue of 0.3% on a 45 μm sieve, determined according to ISO 787/7.

4. The fire-resistant inorganic mortar system according to claim 1, wherein the amorphous calcium carbonate is comprised in the initiator component B of the fire-resistant inorganic mortar system.

5. The fire-resistant inorganic mortar system according to claim 4, wherein the amorphous calcium carbonate comprised in the initiator component B is present in the range of from about 3.0 wt.-% to 20.0 wt.-%, based on the total weight of component B.

6. The fire-resistant inorganic mortar system according to claim 1, wherein the initiator comprises a mixture of lithium salts.

7. The fire-resistant inorganic mortar system according to claim 1, wherein the anchors and post-installed reinforcing bars of are anchor rods, threaded anchor rods, bolts, or steel reinforcement bars.

8. The fire-resistant inorganic mortar system according to claim 1, wherein the mineral substrates are structures made of brickwork, concrete, pervious concrete, or natural stone.

9. The fire-resistant inorganic mortar system according to claim 1, wherein the fire-resistant inorganic mortar system is a fire-resistant multi-component inorganic mortar system.

10. A method for a fire-resistant chemical fastening of anchors and post-installed reinforcing bars in mineral substrates, the method comprising:
   mixing and applying the fire-resistant inorganic mortar system according to claim 1.

11. The fire-resistant inorganic mortar system according to claim 1, wherein the weight ratio between the curable aluminous cement component A and the initiator component B is from 7:1 to 1:3.

12. The fire-resistant inorganic mortar system according to claim 1, wherein said system is a ready-for-use system, wherein the curable aluminous cement component A and the initiator component B are separately produced and introduced into separate containers.

\* \* \* \* \*

UNITED STATES PATENT AND TRADEMARK OFFICE
CERTIFICATE OF CORRECTION

PATENT NO. : 11,267,765 B2
APPLICATION NO. : 16/498231
DATED : March 8, 2022
INVENTOR(S) : Anna Sharmak et al.

It is certified that error appears in the above-identified patent and that said Letters Patent is hereby corrected as shown below:

On the Title Page

Lines 8-9, ABSTRACT, "phosphoric acids" should read --phosphonic acids--;

Page 2, Column 1, Line 11, References Cited, "Oonstantz et al." should read --Constantz et al.--;

Page 2, Column 1, Line 38, References Cited, "2011/0057603" should read --2011/0067603--;

Page 2, Column 2, Line 54, References Cited, "Xianjiang et al," should read --Xianjiang et al.,--;

Page 2, Column 2, Line 60, References Cited, "obtained from from the internet" should read --obtained from the internet--;

Page 3, Column 1, Line 6, References Cited, "Latemula" should read --Laternula--.

Signed and Sealed this
Tenth Day of May, 2022

Katherine Kelly Vidal
*Director of the United States Patent and Trademark Office*